US011601172B2

(12) United States Patent
Logothetis et al.

(10) Patent No.: US 11,601,172 B2
(45) Date of Patent: Mar. 7, 2023

(54) TECHNIQUE FOR CONTROLLING A BEAM PATTERN EMPLOYED BY AN ANTENNA APPARATUS

(71) Applicant: AIRSPAN IP HOLDCO LLC, Boca Raton, FL (US)

(72) Inventors: Andrew Logothetis, Buckinghamshire (GB); Marlon Peter Persaud, Buckinghamshire (GB)

(73) Assignee: AIRSFAN IP HOLDCO LLC, Boca Raton, FL (US)

( * ) Notice: Subject to any disclaimer, the term of this patent is extended or adjusted under 35 U.S.C. 154(b) by 273 days.

(21) Appl. No.: 17/070,764

(22) Filed: Oct. 14, 2020

(65) Prior Publication Data

US 2021/0028841 A1 Jan. 28, 2021

Related U.S. Application Data

(63) Continuation-in-part of application No. 16/443,138, filed on Jun. 17, 2019, now abandoned.

(30) Foreign Application Priority Data

Jun. 20, 2018 (GB) ..................................... 1810122

(51) Int. Cl.
  *H04B 1/02* (2006.01)
  *H04B 7/06* (2006.01)
  *H04W 16/28* (2009.01)
(52) U.S. Cl.
  CPC ......... *H04B 7/0617* (2013.01); *H04B 7/0619* (2013.01); *H04W 16/28* (2013.01)
(58) Field of Classification Search
  CPC .. H04B 7/0617; H04B 7/0619; H04B 7/0695; H04W 16/28
  See application file for complete search history.

(56) References Cited

U.S. PATENT DOCUMENTS 6,229,481 B1   5/2001  Katz
7,151,951 B2*  12/2006 Goransson ........... H04B 7/0615
                                                      455/562.1

(Continued)

FOREIGN PATENT DOCUMENTS

GB    2317786 A    4/1998
WO   2018011777 A1  1/2018

OTHER PUBLICATIONS

DWM Holdings White Paper "Wind-Induced Vibration and the Effects on Steel and Aluminum Light Poles," Jan. 2016, 5 pages.

(Continued)

*Primary Examiner* — Nhan T Le
(74) *Attorney, Agent, or Firm* — Haynes Beffel & Wolfeld LLP; Andrew L. Dunlap

(57) ABSTRACT

A technique is provided for controlling a beam pattern employed by an antenna apparatus. The antenna apparatus comprises an antenna array, and beamforming circuitry to employ a beam pattern in order to generate a beam using the antenna array to facilitate wireless communication with at least one further antenna apparatus. Beam pattern adjustment circuitry is then arranged to receive a control signal indicative of a motion being imparted to the antenna apparatus, and to adjust the beam pattern to be used by the beamforming circuitry in dependence on the control signal, so as to alter a width of the beam in order to mitigate variation in link quality of the wireless communication due to the motion. This hence allows the width of the beam deployed by the antenna apparatus to be adjusted taking into account motion being imparted to the antenna apparatus, so that a balance can be achieved between employing a narrow beam to seek to improve range and resilience to interference, and a wider beam to reduce the variation in link quality that might otherwise arise due to the motion.

28 Claims, 9 Drawing Sheets

(56) References Cited

U.S. PATENT DOCUMENTS

| | | | |
|---|---|---|---|
| 9,923,283 B2* | 3/2018 | Lee | H01Q 21/061 |
| 10,425,140 B2* | 9/2019 | Kim | H04B 7/0691 |
| 11,101,859 B2* | 8/2021 | Choe | H04B 7/0632 |
| 11,329,377 B2* | 5/2022 | Wu | H01P 5/12 |
| 2003/0157897 A1 | 8/2003 | Maeda et al. | |
| 2006/0286974 A1 | 12/2006 | Gore et al. | |
| 2010/0311457 A1 | 12/2010 | Johansson et al. | |
| 2013/0017836 A1 | 1/2013 | Chang et al. | |
| 2013/0040655 A1 | 2/2013 | Keidar | |
| 2013/0040682 A1 | 2/2013 | Chang et al. | |
| 2016/0173149 A1 | 6/2016 | Ling | |
| 2016/0285163 A1 | 9/2016 | Clevom et al. | |
| 2016/0359217 A1 | 12/2016 | Burdick et al. | |
| 2017/0317729 A1 | 11/2017 | Kobayashi et al. | |

OTHER PUBLICATIONS

PCT Search Report and Written Opinion from PCT/GB2019/051419 dated Aug. 12, 2019, 17 pages.
GB Search Report from GB1810122.0 dated Nov. 30, 2018, 4 pages.

* cited by examiner

BEAM PATTERN LOOKUP TABLE

| CONTROL SIGNAL VALUE RANGE | BEAM PATTERN |
|---|---|
| 0 ↔ A | 1 |
| A ↔ B | 2 |
| B ↔ C | 3 |
| ABOVE C | 4 |

ALTERNATIVE BEAM PATTERN LOOKUP TABLE 300

| CONTROL SIGNAL VALUE RANGE FOR INCREASING MOVEMENT | CONTROL SIGNAL VALUE RANGE FOR DECREASING MOVEMENT | BEAM PATTERN |
|---|---|---|
| 0 → X' | X" → 0 | 1 |
| X' → Y' | Y" → X" | 2 |
| Y' → Z' | Z" → Y" | 3 |
| ABOVE Z' | ABOVE Z" | 4 |

FIG. 9

TECHNIQUE FOR CONTROLLING A BEAM PATTERN EMPLOYED BY AN ANTENNA APPARATUS

BACKGROUND

The present technique relates to the field of wireless communications, and in particular to a technique for controlling a beam pattern employed by an antenna apparatus within a wireless communications system.

In modern wireless communications systems, there is a move towards using higher frequency signals, with the aim of increasing the bandwidth. However, path loss issues become more significant as higher frequencies are used, and accordingly there is a tendency to decrease the area covered by each cell within the wireless communications system, providing a larger number of smaller cells, and also to use narrow beams in order to deliver coverage to the edge of the cells within the wireless communications system.

Often, the items of telecommunications equipment used to provide wireless communications coverage within the individual cells can be arranged to be mounted on pre-existing infrastructure within the deployment environment. This can take a variety of forms. For example, the telecommunications equipment may be: (i) mounted on items of street furniture such as lamp posts, poles, bus stops, hoardings, etc., (ii) cable mounted (for example on overhead cables over a road); (iii) mounted on cell towers, radio masts or other such structures which may themselves be mounted to the ground or on a roof top; or (iv) mounted on residential properties. However, under certain environmental conditions vibrations can be imparted to such mounting structures, see for example the article "Wind-Induced Vibration and the Effects on Steel and Aluminum Light Poles" published on the Internet at https://unitedlightingstandards.com/info/wind-induced-vibrations/, which explains the effects of wind induced vibrations on light poles.

In modern wireless communications systems where relatively narrow beams are often deployed in order to deliver coverage within the cells, then when an antenna apparatus is mounted on a structure that may be subjected to such vibrational influences, the resulting movement can adversely affect link quality within the wireless communications system.

SUMMARY

In one example configuration, there is provided an antenna apparatus comprising: an antenna array; beamforming circuitry to employ a beam pattern in order to generate a beam using the antenna array to facilitate wireless communication with at least one further antenna apparatus; and beam pattern adjustment circuitry to receive control signals indicative of a motion being imparted to the antenna apparatus, and to adjust the beam pattern to be used by the beamforming circuitry in dependence on the received control signals, so as to alter a width of the beam in order to mitigate variation in link quality of the wireless communication due to the motion; wherein in response to an indication of an interruption in reception of received motion indication data used to generate the control signals, the beam pattern adjustment circuitry is configured to adjust the beam pattern to be used by the beamforming circuitry to a default beam pattern.

In another example configuration, there is provided a method of controlling a beam pattern employed by an antenna apparatus using an antenna array, comprising: using beamforming circuitry to employ the beam pattern in order to generate a beam using the antenna array to facilitate wireless communication with at least one further antenna apparatus; receiving control signals indicative of a motion being imparted to the antenna apparatus; adjusting the beam pattern to be used by the beamforming circuitry in dependence on the received control signals, so as to alter a width of the beam in order to mitigate variation in link quality of the wireless communication due to the motion; and in response to an indication of an interruption in reception of received motion indication data used to generate the control signals, adjusting the beam pattern to be used by the beamforming circuitry to a default beam pattern.

In a yet further example configuration, there is provided an antenna apparatus comprising: antenna array means; beamforming means for employing a beam pattern in order to generate a beam using the antenna array means to facilitate wireless communication with at least one further antenna apparatus; and beam pattern adjustment means for receiving control signals indicative of a motion being imparted to the antenna apparatus, and for adjusting the beam pattern to be used by the beamforming means in dependence on the received control signals, so as to alter a width of the beam in order to mitigate variation in link quality of the wireless communication due to the motion; wherein in response to an indication of an interruption in reception of received motion indication data used to generate the control signals, the beam pattern adjustment means is configured to adjust the beam pattern to be used by the beamforming means to a default beam pattern.

BRIEF DESCRIPTION OF THE DRAWINGS

The present technique will be described further, by way of illustration only, with reference to examples thereof as illustrated in the accompanying drawings, in which:

FIG. 9 illustrates an alternative form of beam pattern lookup table that may be used in some implementations.

DESCRIPTION OF EXAMPLES

Figure 1:
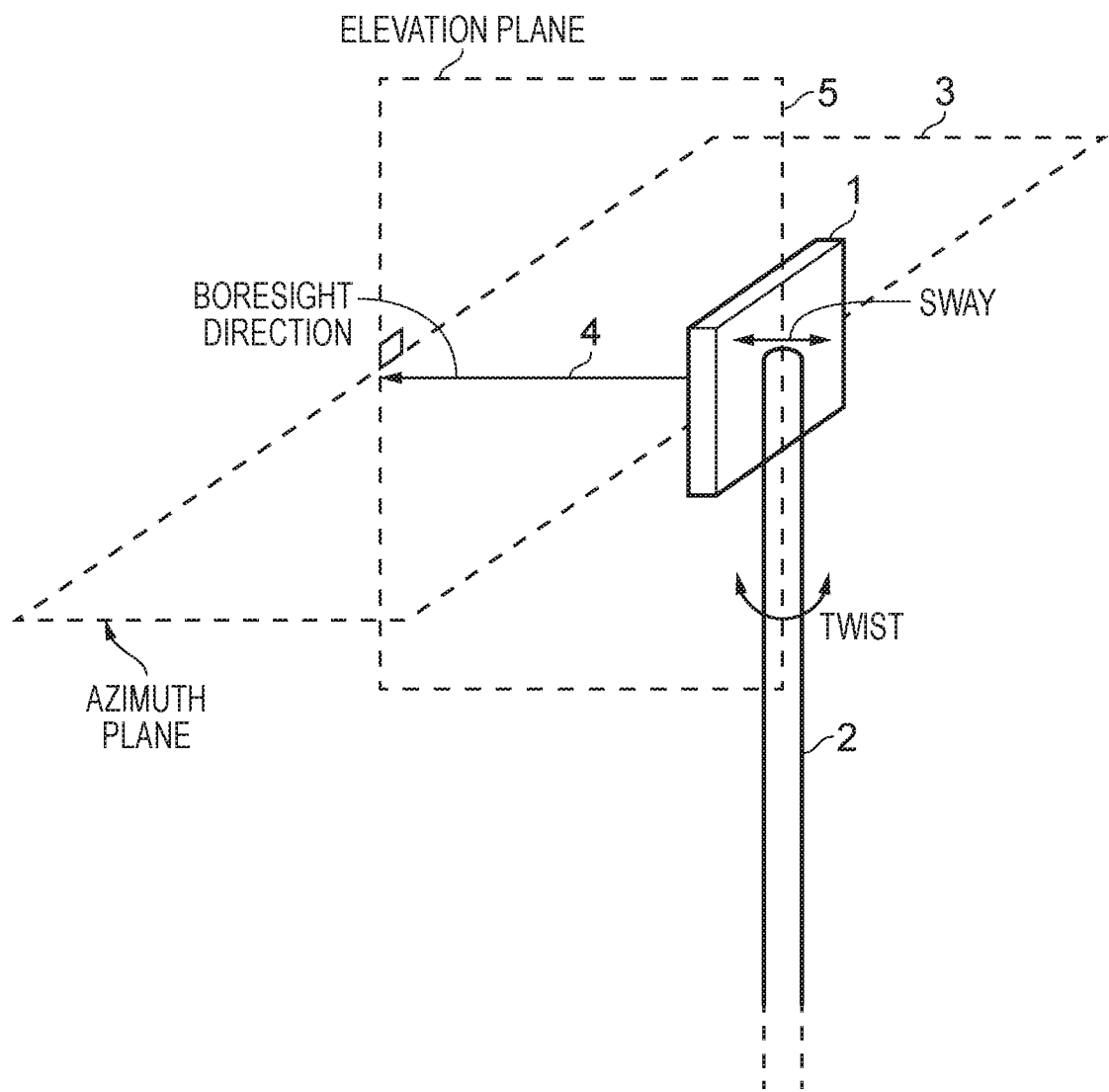
FIG. 1 is a diagram schematically illustrating an antenna apparatus mounted on a pole.

In one example implementation, an antenna apparatus is provided that comprises an antenna array, and beamforming circuitry to employ a beam pattern in order to generate a beam using the antenna array to facilitate wireless communication with at least one further antenna apparatus. The antenna array may include transmit antenna elements and/or receive antenna elements, and indeed may be used for both transmission and reception, and accordingly the beam pattern generated can be used as a transmit beam and/or a receive beam, in the latter case the receive beam pattern identifying the coverage area where the antenna array is most sensitive to transmitted signals from other items of antenna equipment.

Beam pattern adjustment circuitry is also provided within the antenna apparatus to receive control signals indicative of a motion being imparted to the antenna apparatus, and to adjust the beam pattern to be used by the beamforming circuitry in dependence on the received control signals, so as to alter a width of the beam in order to mitigate variation in link quality of the wireless communication due to the motion. In particular, the inventors observed that it is the variation in link quality caused by motion of the antenna apparatus (e.g. due to the swaying of the antenna apparatus in the wind or, when the antenna apparatus is mounted on a moving vehicle, due to the motion of the moving vehicle) that can significantly degrade communications within the wireless communications system using that antenna apparatus. In accordance with the techniques described herein, the aim of the beam pattern adjustment circuitry is to alter the width of the beam so as to seek to reduce variation in the link quality, having regard to the motion being imparted to the antenna apparatus.

One issue that can arise is how to handle a situation where there is an interruption in received motion indication data used to generate the control signals. In accordance with the techniques described herein, the beam pattern adjustment circuitry is also arranged to respond to an indication that reception of the received motion indication data has been interrupted by adjusting the beam pattern to be used by the beamforming circuitry to a default beam pattern.

In this way, a pessimistic assumption about the extent of any motion being imparted on the antenna apparatus can be made, based on the observation by the inventors that it is the variation in link quality that can significantly degrade communications within the wireless communications network. For example, the default beam pattern may be selected based on an assumption that significant motion is being imparted on the antenna apparatus, which could lead to a significant variation in link quality. The default beam pattern may, therefore, have a shape selected to mitigate the assumed reduction in link quality. Therefore, by employing a default beam pattern when an interruption in the reception of motion indication data is detected, the antenna apparatus can mitigate potential variation in link quality due to the motion of the antenna apparatus, even when the extent of the motion imparted on the antenna apparatus is unknown (due to the motion indication data not being received).

In one example, the indication of the interruption in reception of the received motion indication data may be an interruption in the reception of the control signals. For example, the control signals may only be generated and/or transmitted to the beam pattern adjustment circuitry when the motion indication data is received.

In another example, the indication of the interruption in reception of the received motion indication data may be a form of the received control signals themselves, indicating that the motion indication data has not been received. For example, control signals may still be generated and transmitted to the beam pattern adjustment circuitry when the motion indication data is not received, but they may be a different form of control signals to those transmitted in response to received motion indication data.

When reception of the received motion indication data resumes, following an interruption, it may no longer be as appropriate to take such a pessimistic view of the motion imparted on the antenna apparatus. Therefore, in one example, the beam pattern adjustment circuitry is responsive to an indication that reception of the motion indication data has resumed to resume adjusting the beam pattern to be used by the beamforming circuitry in dependence on the received control signals. In this way, the beam pattern adjustment circuitry returns to a more tailored approach to adjusting the beam pattern, in consideration of the motion actually imparted on the antenna apparatus. Thus, the variation in link quality due to this motion can be mitigated more accurately.

In one example, the default beam pattern produces a beam having a width greater than a predetermined width. In this way, a wide beam can be employed when the extent of the motion imparted on the antenna apparatus is unknown, taking a pessimistic view that the extent of the motion is large. This allows any variation in link quality caused by the motion to be mitigated, even though the extent of the motion is unknown. The predetermined width can be selected by a user, and may be implementation-dependent, but in some examples the predetermined width may be chosen such that the default beam pattern is the widest beam that can be employed by the beamforming circuitry. Alternatively, if it is determined that the loss in antenna gain due to such a large beam is too great for the particular implementation, the default beam may be narrower. In either case, there is a trade off between the variation in link quality, and the loss in antenna gain.

The beam pattern adjustment circuitry may be arranged to employ the default beam pattern in response to an indication of any interruption in the reception of motion indication data. However, if reception of the motion indication data is only momentarily interrupted, it may be counterproductive to employ the default beam pattern, only to switch back to adjusting the beam pattern on the basis of the received control signals once reception of the motion indication data is resumed. Therefore, in one example, the beam pattern adjustment circuitry is instead arranged to employ the default beam pattern in response to an indication that the interruption in reception of the received motion indication data has exceeded a predetermined time (which may be selected by a user, in dependence on the particular implementation). This can avoid the antenna gain being reduced unnecessarily, when the interruption in the reception of the motion indication data is only momentary.

In one example, when the employed beam pattern produces a beam having a first width, the beam pattern adjustment circuitry may be arranged to be responsive to the control signal indicating motion that is considered to cause a variation in link quality exceeding a chosen threshold, to adjust the employed beam pattern such that the beam produced has a second width greater than the first width. By increasing the width of the beam, this may slightly decrease the array gain, particularly in the predominant direction of the narrower beam, but can significantly reduce the variation in link quality, thus improving the overall quality of wireless communication within the system.

In addition to being receptive to certain types of motion to widen the beam produced, the beam pattern adjustment circuitry can also be arranged under certain conditions to narrow the beam produced. For example, when the employed beam pattern produces a beam having the second width, the beam pattern adjustment circuitry may be arranged to be responsive to the control signal indicating motion that is considered to cause a variation in link quality below the chosen threshold, to adjust the employed beam pattern such that the beam produced has the first width. Hence, when it is determined that the motion is no longer sufficient to cause an unacceptable variation in link quality, it can be decided to narrow the beam, so as to benefit from the improved array gain and link quality that can be achieved when using a narrow beam under conditions where the motion is not causing an undue variation in link quality.

The basic technique described above can be extended to allow for multiple thresholds to be used, each with associated beam pattern adjustments. Accordingly, in one example implementation, the beam pattern adjustment circuitry may be arranged to be responsive to a plurality of thresholds associated with corresponding variations in link quality, and to adjust the employed beam pattern so as to adjust the beam width in dependence on each threshold being passed. Hence, this can allow for various degrees of motion to be compensated for, whilst seeking to maintain a balance between broadening a beam to reduce the variation in link quality, and maintaining a relatively narrow beam so as to seek to improve range and reduce interference.

The manner in which adjustment of the employed beam pattern is triggered in dependence on the control signal can be varied dependent on implementation. For example, whilst a specific value of the control signal may be associated with a corresponding threshold, it can in some implementations be decided to defer triggering an adjustment of the employed beam pattern until it is seen that the value of the control signal is reliably exceeding, or reliably falling below, the value of the control signal associated with the threshold, to thereby introduce a form of hysteresis in order to ensure that the beam pattern is not adjusted unnecessarily. Hence, in one example implementation, the beam pattern adjustment circuitry may be arranged to trigger adjustment of the employed beam pattern when a sequence of values of the control signal indicate that the chosen threshold has been passed. The control signal may be generated such that it directly provides a sequence of discrete values, or alternatively the control signal may be generated as a continuous signal, with the beam pattern adjustment circuitry sampling values of the control signal in order to obtain a sequence of values. By waiting until a sequence of values of the control signal indicate that the chosen threshold has been passed, this avoids jitter in the adjustment of the employed beam pattern that could arise if the beam pattern adjustment circuitry were to merely respond to individual values of the control signal when deciding the point at which the beam pattern should be adjusted.

There are a number of ways in which the beam pattern adjustment circuitry can be arranged to be responsive to a sequence of values of the control signal that indicate that the chosen threshold has been passed. For example, in one implementation, the beam pattern adjustment circuitry is arranged to maintain a counter value to track occurrences of values of the control signal that indicate that the chosen threshold has been passed, and to trigger adjustment of the employed beam pattern in dependence on the counter value. Accordingly, when the counter value reaches a predetermined value, then that can be used to trigger adjustment of the beam pattern. There are a number of ways in which the counter value could be adjusted. For example, it could be re-initialised each time the value of the control signal indicates that the currently employed beam pattern is the appropriate beam pattern to use, and can then be incremented each time the value of the control signal indicates that a change in the beam pattern is appropriate.

It will be appreciated that the above described mechanism implements a form of time-based hysteresis in the adjustment of the beam pattern. Alternatively, or in addition, a value-based hysteresis mechanism can be implemented. For example, the value of the control signal that is associated with the chosen threshold may differ depending on whether the motion is increasing or decreasing. Hence, for example, the value of the control signal that triggers a widening of the beam can be set higher than the corresponding value that would trigger that widened beam being returned to a narrower beam.

There are a number of ways in which the beam pattern adjustment circuitry can determine the beam pattern to be used at any particular point in time. For example, in one implementation the antenna apparatus may further comprise storage to identify a plurality of beam patterns used to produce different width beams, and the beam pattern adjustment circuitry may be arranged to select from the plurality of beam patterns a current beam pattern to be employed by the beamforming circuitry, dependent on the control signal. Hence, for example, the current value of the control signal can be used to perform a lookup within the storage to identify the appropriate beam pattern having regard to the current value of the control signal. If that identified beam pattern differs from the current beam pattern, and taking into account any time-based hysteresis process that may be employed as discussed earlier, the beam pattern adjustment circuitry can then be arranged to trigger a change in the beam pattern employed, so as to employ the beam pattern identified by the lookup procedure within the storage.

The beam patterns can be identified within the storage in a variety of ways. For example, sets of beamforming coefficients may be specified for each beam pattern, with those beamforming coefficients then being used in order to produce a particular beam pattern.

The control signal can be generated in a variety of ways, but in one example implementation the control signal used by the beam pattern adjustment circuitry is indicative of motion over a period of time. Hence, this can ensure a damping effect on the value of the control signal produced at any particular point in time, since that value will be dependent on both a currently observed motion and the motion as observed during a preceding period of time. In situations where the motion is determined by sensor readings from a movement sensor, then a number of sensor readings at different points in time can be used to determine the current value of the control signal.

The antenna apparatus may further comprise control signal generation circuitry that is arranged to generate the control signal dependent on received motion indication data. In one example implementation, the control signal generation circuitry is arranged to generate the control signal such that a current value of the control signal is dependent on motion indication data indicative of motion at a plurality of points in time.

There are a number of ways in which the motion indication data can be obtained by the control signal generation circuitry. In one example implementation, the antenna apparatus further comprises at least one motion sensor to detect the motion being imparted to the antenna apparatus, and the control signal generation circuitry is arranged to determine the control signal provided to the beam pattern adjustment circuitry based on movement data produced by the at least one motion sensor.

The types of motion that may be detected by the motion sensor(s) can take a variety of forms. For example, the motion detected may be an oscillating motion of the antenna apparatus caused by an environmental influence, for example by wind or by some seismic disturbance. The oscillating motion can arise for a variety of reasons, and could for example result from the vibration of a mounting structure to which the antenna apparatus is fixed. The oscillating motion itself can take a variety of forms, for example a generalised vibration, a sway motion or a twist motion. Particularly problematic in the current context is any form of oscillating motion that causes the beam to move to an extent that causes significant variation in link quality between the antenna apparatus and the other items of antenna equipment with which the antenna apparatus is communicating. In this context, it has been found that a twisting motion imparted to the antenna apparatus can be particularly problematic, and accordingly in one example implementation the at least one motion sensor comprises at least a sensor to detect a twisting motion imparted to the antenna apparatus.

The one or more motion sensors used can take a variety of forms, but in one example implementation the at least one motion sensor comprises one or more of a magnetometer and an accelerometer. For an antenna apparatus that is mounted such that its azimuth plane is in an essentially horizontal direction, the use of a magnetometer can provide a signal that is indicative of twisting motion imparted to the antenna apparatus. This could for example be used in combination with the outputs from an accelerometer, which in one implementation could provide motion signals in each of the x, y and z coordinate directions.

The control signal generation circuitry can be formed in a variety of ways, but in one implementation comprises filtering circuitry to apply a filtering operation to determine the control signal based on the movement data received at multiple points in time. Any appropriate filtering operation could be applied. For example, in one implementation the movement data values may be filtered using an asymmetric IIR (Infinite Impulse Response) filter.

In one particular example implementation, the filtering circuitry is arranged to produce the control signal from a filtered movement data value d(k), where k is a sampling time, by performing the following computation:

$$d(k)=\rho_{up} \cdot d(k-1)+(1-\rho_{up}) \cdot z(k), \text{ if } z(k) > d(k-1)$$

and $$d(k)=\rho_{down} \cdot d(k-1)+(1-\rho_{down}) \cdot z(k), \text{ otherwise,}$$

where z(k) denotes an item of movement data at sampling time k, $\rho_{up}$ is a first chosen value between 0 and 1, and $\rho_{down}$ is a second chosen value between 0 and 1.

The values of $\rho_{up}$ and $\rho_{down}$ can be chosen having regard to how sensitive it is desired to make beam adjustments in response to varying movement data, for both increasing movement and decreasing movement. Purely by way of specific example, $\rho_{up}$ could be set to 0.1 to quickly capture deteriorating conditions due to motion, whilst $\rho_{down}$ could be set to 0.99 to allow for heavy filtering when conditions improve (it may be too pessimistic, but ensures stable performance).

Where movement data is obtained from more than one motion sensor, then the above filtering operation could be applied independently to each of the forms of movement data obtained, and then the filtered movement data values from each of the sensors could be combined in an appropriate manner. For example, the filtered movement data values could be linearly combined with weights dependent on the quality of the sensor measurements. For example, a sensor providing more reliable data may be weighted more compared to a sensor that yields measurements with a higher standard deviation. The control signal can then be produced from the combined filtered movement data values.

In one example implementation, the filtering circuitry may also be arranged to receive an indication of observed variation in link quality, for use in determining the control signal. For example, in one implementation, the observed variation in link quality is used by the filtering circuitry to influence a decision, based on the movement data, as to when to adjust the beam pattern so as to widen the beam produced. How the observed variation in link quality is used to influence the decision can vary dependent on implementation, but in one example implementation this information may be used to alter the value of the control signal produced by the control signal generation circuitry. For example, in situations where the movement data is indicating an undesirable level of movement, but the observed variation in link quality indicates that the link quality is better than expected, it may be decided to reduce the control signal value output, so as to decrease the likelihood that the beam pattern adjustment circuitry will change the beam to a wider beam.

In one example implementation, the observed variation in link quality is not used when deciding when to return to the use of a narrower beam. Indeed, if the movement data indicates that the motion has decreased to an extent where a narrower beam can be deployed, then it will be appropriate to switch to the narrower beam, since that will improve link quality in such situations.

Particular examples will now be described with reference to the Figures.

FIG. 1 is a block diagram showing an antenna apparatus 1 mounted to a supporting structure 2. The supporting structure can take a variety of forms, but in the example illustrated is a pole. This may be a pole that is dedicated for use with the antenna apparatus, or alternatively may be a pre-existing item of street furniture, such as a light pole used to support a street lamp. The antenna apparatus may be mounted on the pole 2 in any desired orientation, but in the example shown in FIG. 1 it is assumed that the unit is mounted so that the generated beam (whether a transmit beam or a receive beam) extends in a predominantly horizontal direction. In particular, an azimuth plane 3 can be defined, in which the beam may be steered electronically in order to vary the boresight direction 4, the boresight direction being the axis of maximum gain. Hence, by default, the boresight direction may extend perpendicularly to the surface of the antenna array within the antenna apparatus 1, but via electronic beam steering the predominant direction of the beam may be steered left or right within the azimuth plane 3. The beam will also have a form within the elevation plane 5, which extends at right angles to the azimuth plane 3. Depending on the type of implementation, electronic beam steering may also allow the beam to be altered directionally within the elevation plane, which in combination with directional adjustment in the azimuth plane may enable the beam to be steered within three dimensions. However, in one example implementation, the electronic beam steering is constrained to take place within the azimuth plane 3, allowing a narrow beam to be directed as desired within the azimuth plane 3. However, within the elevation plane 5, the profile of the beam is arranged to be relatively wide, to allow for differences in height between the antenna apparatus 1 and other items of antenna equipment with which that antenna apparatus may communicate.

When an oscillating motion is imparted to the pole 2, for example due to environmental influences such as wind, or seismic disturbances imparting a vibration to the pole from the ground, this can cause the antenna apparatus 1 itself to move, and as a result may cause the formed beam to move within three dimensional space. When the antenna apparatus is arranged to provide a relatively narrow beam, this can cause significant variation in the link quality observed between the antenna apparatus and a further apparatus with which wireless communication is being performed. This variation in link quality can be more problematic than just a general reduction in average link quality, and can become particularly problematic with certain types of oscillating motion.

For example, when a narrow beam is being produced within the azimuth plane 3, it will be appreciated that a twisting motion on the pole 2 will cause the boresight direction 4 to potentially move significantly in an oscillating motion within the azimuth plane. This may cause disruption in the communication with a further antenna apparatus, which can become particularly pronounced due to the narrow beam used.

As another example, the swaying of the pole, such as in the forwards and backwards direction as shown in FIG. 1, can also cause the boresight direction to move within the elevation plane, in particular, causing the boresight direction to oscillate upwards and downwards. Again, this can cause significant variation in the link quality. However, the extent of the issue caused by such swaying motion may depend on how narrow the beam is in the elevation plane. As mentioned earlier, in one particular example, the beam may be narrow in the azimuth plane, but may have a profile in the elevation plane which is significantly broader. In that particular instance, the swaying motion such as illustrated in FIG. 1 may have less of an effect on the link quality than the twisting motion shown in FIG. 1. However, in general terms, it will be appreciated that various different types of motion imparted to the antenna apparatus could cause significant variation in link quality in some circumstances, which is particularly exacerbated when narrow beams are being used. The techniques described herein aim to provide a mechanism by which the antenna apparatus can obtain information about the degree of movement that it is being subjected to, and can take steps to alter the beam pattern employed so as to seek to mitigate variation in link quality that may otherwise arise due to that motion.

Whilst in FIG. 1 the azimuth plane is shown as being essentially horizontal, and accordingly the elevation plane is shown as being essentially vertical, it will be appreciated that in any particular deployment the positioning of the antenna apparatus may be such that the azimuth plane is not completely horizontal, and accordingly the elevation plane is not completely vertical. However, the above described concepts still apply, irrespective of the absolute orientation of the azimuth and elevation planes.

Figure 2:
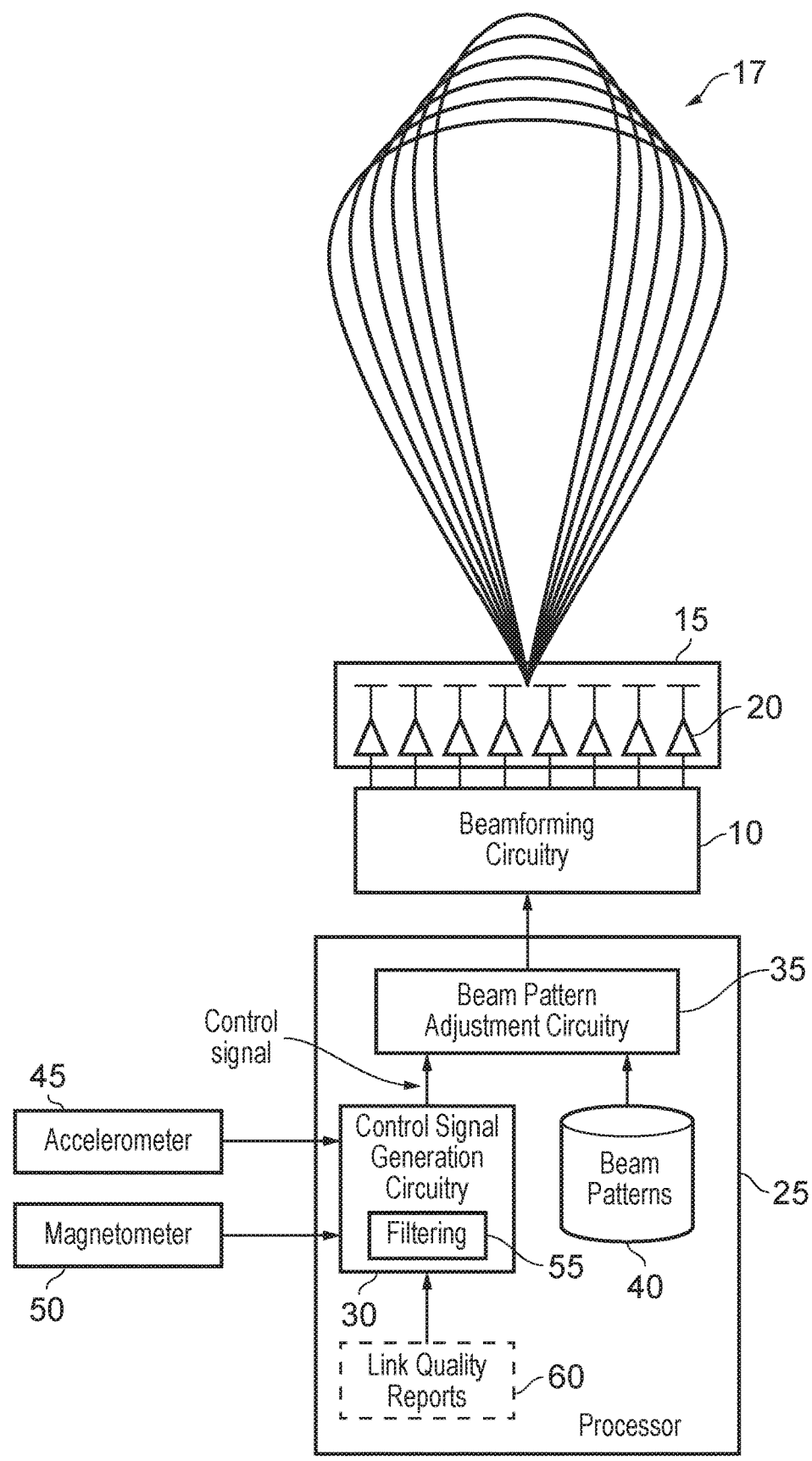
FIG. 2 is a block diagram schematically illustrating an antenna apparatus in accordance with one example implementation.

FIG. 2 is a block diagram illustrating components that may be provided within the antenna apparatus 1 in one example implementation. An antenna array 15 can be provided formed of individual antenna elements 20. The individual antenna elements may be arranged in an array so as to extend in two perpendicular directions. In the example shown in FIG. 2, it is assumed that the azimuth plane 3 is aligned with the plane of the paper, and each element 20 may actually comprise a column of antenna elements extending perpendicular to the surface of the paper. Within such an arrangement, beamforming techniques may be arranged to electronically steer the beam within the azimuth plane. For the sake of example illustration, it will be assumed that the beam pattern may be controlled within the azimuth plane but that within the elevation plane the chosen beam pattern has a relatively broad spread, and no active steps are taken to steer the beam in the elevation plane.

The antenna array 15 is controlled by beamforming circuitry 10, which controls the individual antenna elements so as to produce the desired beam. The beamforming circuitry 10 is itself controlled by beam pattern adjustment circuitry 35, which can for example provide a set of beamforming coefficients to the beamforming circuitry 10 to control the beam that is formed using the array of antenna elements. In addition to controlling direction of the beam, the width of the beam can be controlled, as illustrated by the schematic 17, and the input from the beam pattern adjustment circuitry 35 can be used to control this aspect of the beam pattern generation.

The beam pattern adjustment circuitry 35 has access to a storage 40 providing information about a plurality of different beam patterns that can be employed, and the beam pattern adjustment circuitry is arranged to select one of those beam patterns based on a control signal that it receives from the control signal generation circuitry 30. The control signal is generated by the control signal generation circuitry 30 taking into account movement data received from one or more motion sensors. In the example shown, two motion sensors are provided, namely an accelerometer 45 and a magnetometer 50. The magnetometer can be viewed of as essentially being a compass, hence providing an indication of the angular bearing of the antenna apparatus. In one example, the magnetometer may take the form of a 3D magnetic sensor, so that the earth's local magnetic field strength in x, y and z coordinates is measured.

As will be appreciated from FIG. 1, when the antenna apparatus is located so that the azimuth plane is essentially horizontal, the magnetometer reading can give an indication of the twist being imparted on the antenna apparatus, or more particularly the variation in the magnetometer reading can give an indication of the amount of twisting motion that is being imparted on the antenna apparatus 1. The accelerometer 45 can be arranged to provide acceleration information in one or more axes, and in one particular example is a three axis accelerometer providing acceleration information in the x,y and z coordinates, which can provide reliable readings for swaying motion. Further, it should be noted that by placing one (or better two) accelerometers at the furthest part of the apparatus (for example one to the left and/or to the right side of the antenna array), this can increase the sensitivity to other forms of swaying motion.

The information from the various motion sensors can be used by the control signal generation circuitry 30 to generate a control signal that is then used by the beam pattern adjustment circuitry 35 to determine which beam pattern is appropriate to use. In one example implementation, the storage 40 may effectively provide a form of lookup table, where different values of the control signal are associated with different beam patterns, so that the beam pattern adjustment circuitry can perform a lookup operation in the storage to determine which beam pattern is most appropriate having regards to the current control signal value.

Whilst the beam pattern adjustment circuitry 35 could merely be arranged to operate directly based on the current value of the control signal, if desired the beam pattern adjustment circuitry can be arranged to apply a form of hysteresis so that any adjustment in the beam pattern only occurs after the value of the control signal has been observed as reliably indicating the need for a switch in beam pattern for a certain period of time, to hence avoid any jitter in the adjustment of the beam where the beam is switched backwards and forwards between different beam patterns due to the control signal value varying either side of a particular threshold.

Alternatively, or in addition, a value-based hysteresis approach could be used, where the value of the control signal that is associated with a chosen threshold between two different beam patterns differs depending on whether the motion is increasing or decreasing. Such an example will be discussed later with reference to FIG. 9.

Whilst in one implementation the value of the control signal can be based solely on the current motion indication signals from the one or more sensors 45, 50, in another implementation a filtering operation 55 is applied in order to cause the value of the control signal to be indicative of motion over a period of time. The period of time can be controlled in a variety of ways, but in one example the filtering operation may use both a current sensor reading and data derived from at least the most immediately preceding sensor reading, when generating the filtered version of the sensor reading to be used in generating the control signal. Where, as shown in FIG. 2, readings from multiple sensors may be obtained, then the filtering operation can be applied independently to each of the sensor readings, and then those filtered sensor readings combined in order to produce the control signal. When combining the signals from multiple sensors, the readings from one sensor may be prioritised over the readings from another sensor if desired. For example, the filtered sensor readings could be linearly combined with weights dependent on the quality of the sensor measurements from the individual sensors.

If desired, link quality reports 60 indicative of the actual link quality being observed within the system can also be input to the control signal generation circuitry 30 for use in determining the control signal. In one particular implementation, such link quality reports are factored into the generation of the control signal when the motion indication data is indicating that motion is increasing, and hence there is a likelihood that the beam pattern will be changed to choose a slightly wider beam in order to seek to mitigate the effects that the motion may otherwise have on variation in link quality, but such observed link quality information is not used when the amount of motion observed by the motion sensors is decreasing. In particular, when the motion is decreasing, it is appropriate to switch to a narrower beam as soon as possible, so as to improve the average link quality observed. Hence, moving to a narrower beam will result in improved link quality reports with regards to the average link quality observed.

However, when the motion is increasing the link quality reports can be used as an effective double check before a decision is taken to widen a beam. In particular, by widening the beam, although this will reduce the variation in link quality that may otherwise occur due to the motion, it will also reduce the average link quality. Accordingly, if the motion sensor information is indicating a level of movement that may be considered appropriate to warrant a change to a wider beam, but the link quality reports indicate that the link quality is somewhat higher than expected, then the link quality information can be used to influence the control signal so that the beam pattern adjustment circuitry is less likely to switch to a wider beam at that point in time. There are a number of ways in which the link quality reports can be used to influence this process, but in one example they may cause the value of the control signal to be reduced relative to the value that would be output based purely on the motion sensor information.

The various components shown in FIG. 2 may be provided as dedicated components for performing the above-described functions. However, in one implementation, the control signal generation circuitry 30 and the beam pattern adjustment circuitry 35 can be implemented by software executing on a general purpose processor 25, where that processor also has storage to maintain the beam pattern information 40, and the link quality report information 60 that may optionally be used by the control signal generation circuitry 30.

Figure 3:
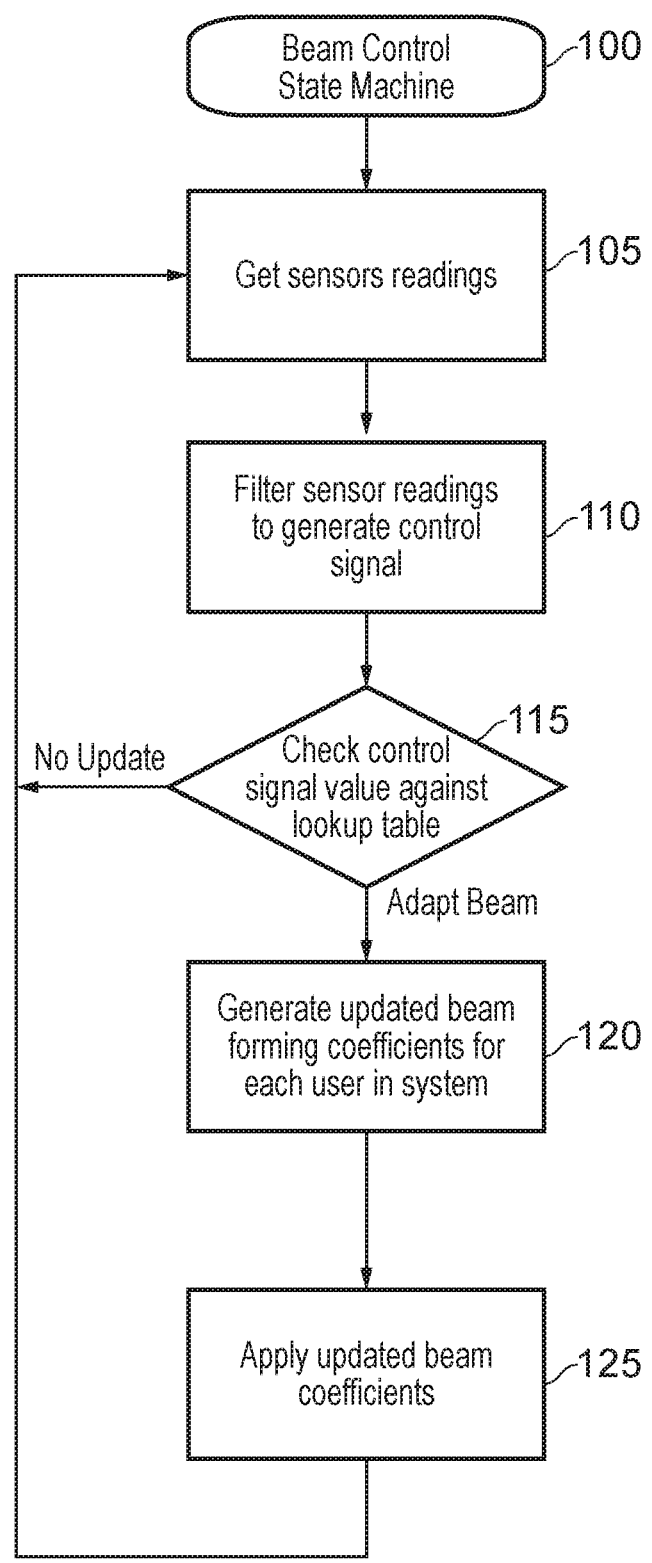
FIG. 3 is a flow diagram illustrating steps performed by the apparatus of FIG. 2 in one example in order to adjust a beam pattern used by the antenna apparatus under certain situations.

FIG. 3 is a flow diagram illustrating a beam control state machine process 100 that may be implemented by the processor 25 in order to perform the control signal generation and beam pattern adjustment processes discussed earlier.

At step 105, sensor reading are obtained from the various sensors 45, 50. At step 110, those sensor readings are filtered by the control signal generation circuitry 30 using the associated filter operation 55 in order to generate an updated value for the control signal output to the beam pattern adjustment circuitry 35. More details of the performance of this step in one particular example implementation will be discussed later with reference to FIG. 4.

At step 115, the beam pattern adjustment circuitry 35 then checks the control signal value against the lookup table in order to determine whether a change to the beam pattern is appropriate or not. There are a number of ways in which this step could be implemented, but one particular example will be discussed later with reference to FIGS. 7 and 8.

If it is determined that no adjustment needs to be made to the beam pattern, then the process returns to step 105 to await the next sensor readings from the sensors 45, 50. However, if instead it is decided that it is appropriate to adapt the beam, then at step 120 the beam pattern adjustment circuitry 35 is arranged to generate the update beamforming coefficients for each user in the system. In particular, the beam being generated by the antenna array 15, whether a transmission beam or a reception beam, will be used to facilitate communication with one or more other antenna systems within the wireless communication network, these other antenna systems being the various "users" in this context. Those other antenna systems may be associated with particular items of end user equipment in some instances, or may be other components within the wireless communication system, for example base station components, relay components, etc. The exact form of beam produced takes into account the other antenna systems with which communication is to be effected using the beam pattern.

Once the updated beamforming coefficients have been generated, then the process proceeds to step 125, where the beamforming circuitry 10 then applies the beamforming coefficients in order to generate the desired beam pattern.

Figure 4:
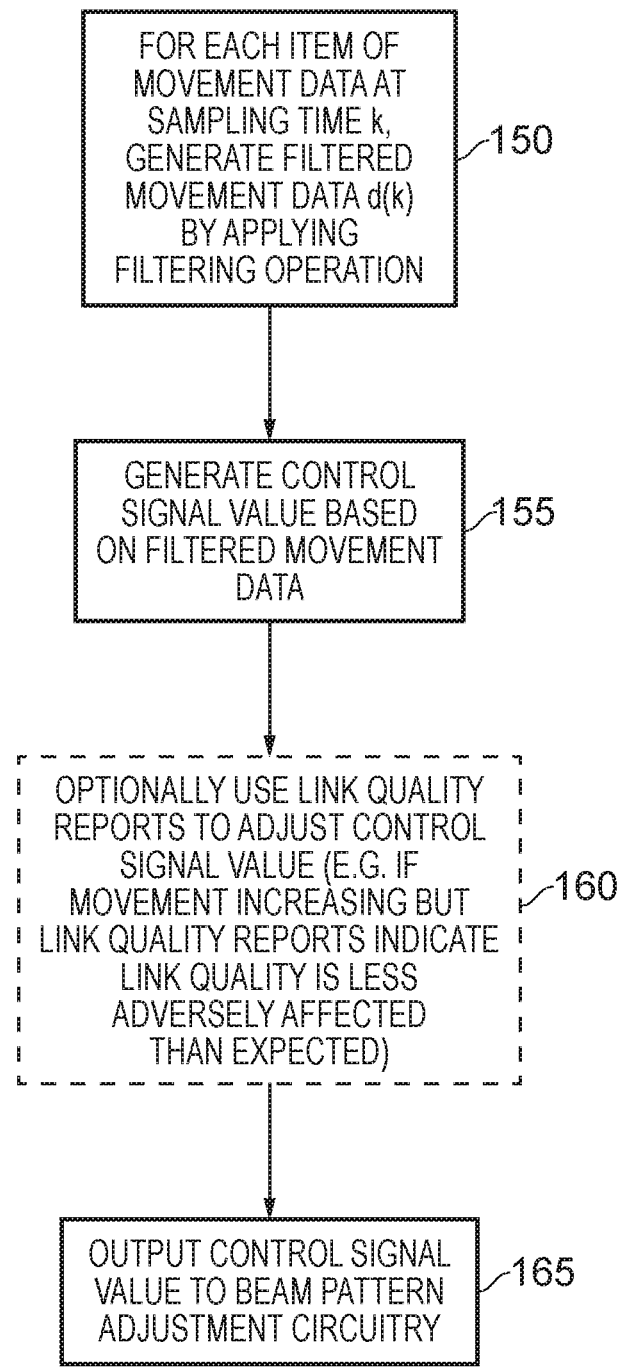
FIG. 4 is a flow diagram illustrating in more detail the step of filtering the sensor readings of FIG. 3 in accordance with one example implementation.

FIG. 4 is a flow diagram illustrating the steps that may be performed when using the apparatus of FIG. 2 in order to implement step 110 of FIG. 3, i.e. to filter the sensor readings in order to generate an updated value for the control signal to be output to the beam pattern adjustment circuitry 35. At step 150, for each item of movement data received at sampling time k then a filtering operation is applied to generate a filtered version of that movement data d(k). The filtering operation can take a variety of forms, and may for example use an asymmetric IIR filter in order to produce the filtered movement data. In one particular implementation, the filtering operation performs the following computation:

$$d(k) = \rho_{up} \cdot d(k-1) + (1-\rho_{up}) \cdot z(k), \text{ if } z(k) > d(k-1)$$

and $$d(k) = \rho_{down} \cdot d(k-1) + (1-\rho_{down}) \cdot z(k), \text{ otherwise,}$$

where $z(k)$ denotes an item of movement data at sampling time k, $\rho_{up}$ is a first chosen value between 0 and 1, and $\rho_{down}$ is a second chosen value between 0 and 1.

Hence, it will be seen that in accordance with that implementation, the currently received item of movement data is combined with the previous value of the filtered movement data for the same sensor, with the ratios by which those two values are combined being dependent on whether motion is increasing or decreasing, more particularly in dependence on whether the currently sampled item of movement data is larger than the previously generated filtered movement data or not.

The values of the parameters $\rho_{up}$ and $\rho_{down}$ can be chosen as desired, depending on the extent to which the current item of movement data is intended to influence the updated value of the filtered movement data. By way of specific example, $\rho_{up}$ could be set to 0.1 to quickly capture deteriorating conditions due to motion, whilst $\rho_{down}$ could be set to 0.99 to allow for heavy filtering when conditions improve, i.e. the motion is decreasing (in this latter case this may be quite pessimistic, but will ensure stable performance by ensuring that a switch back to a narrower beam takes place only when the motion as indicated by the sampled data from the sensors reliably shows a decrease in motion).

Once step 150 has been performed for each item of movement data received at sampling time k, then an updated value for the control signal can be generated based on the filtered movement data. In an example where only one sensor is used, producing one item of movement data at a particular sampling time, then the filtered movement data may be used directly to form the updated control signal value. However, in implementations where multiple items of movement data are received at sampling time k, either due to there being multiple sensors, and/or one of the sensors producing multiple items of movement data (for example relating to movement in different dimensions), then the control signal value can be updated based on a combination of the filtered movement data values obtained at step 150. For example, as discussed earlier the various filtered movement data values may be linearly combined with weights dependent on the quality of the sensor measurements. For instance, a sensor providing more reliable data may be weighted more compared to a sensor that yields measurements with higher standard deviation.

In one implementation, once the control signal has been generated at step 155, it can then be output at step 165 to the beam pattern adjustment circuitry. However, as indicated by the dotted box 160, in one example link quality reports relating to actual observed link quality within the system may optionally be used to adjust the control signal in certain situations. There are a number of ways in which the link quality reports could be used. However, in one example the link quality reports are used as a qualifying measure when motion is increasing, but are not used when motion is decreasing. For example, as discussed earlier, if the movement data is indicating that the movement is increasing to a point where it might be appropriate to switch to a wider beam, but the link quality reports indicate that the variation in link quality observed is not as significant as expected, that information could be used to suppress the value of the control signal output, which in turn would reduce the likelihood of the beam being switched to a wider beam at that point in time. Once any adjustment to the control signal value has been made based on the link quality reports at step 160, then the control signal value is output to the beam pattern adjustment circuitry at step 165.

In the example discussed above, the link quality reports are only used to potentially qualify any adjustment to the beam pattern that would otherwise be indicated by the motion data. In particular, there are other reasons unrelated to movement that could cause link quality to drop, for example co-channel interference, and hence it would not be appropriate to adjust the beam pattern based solely on the link quality reports when seeking to address the issues caused by motion discussed herein.

Figure 5:
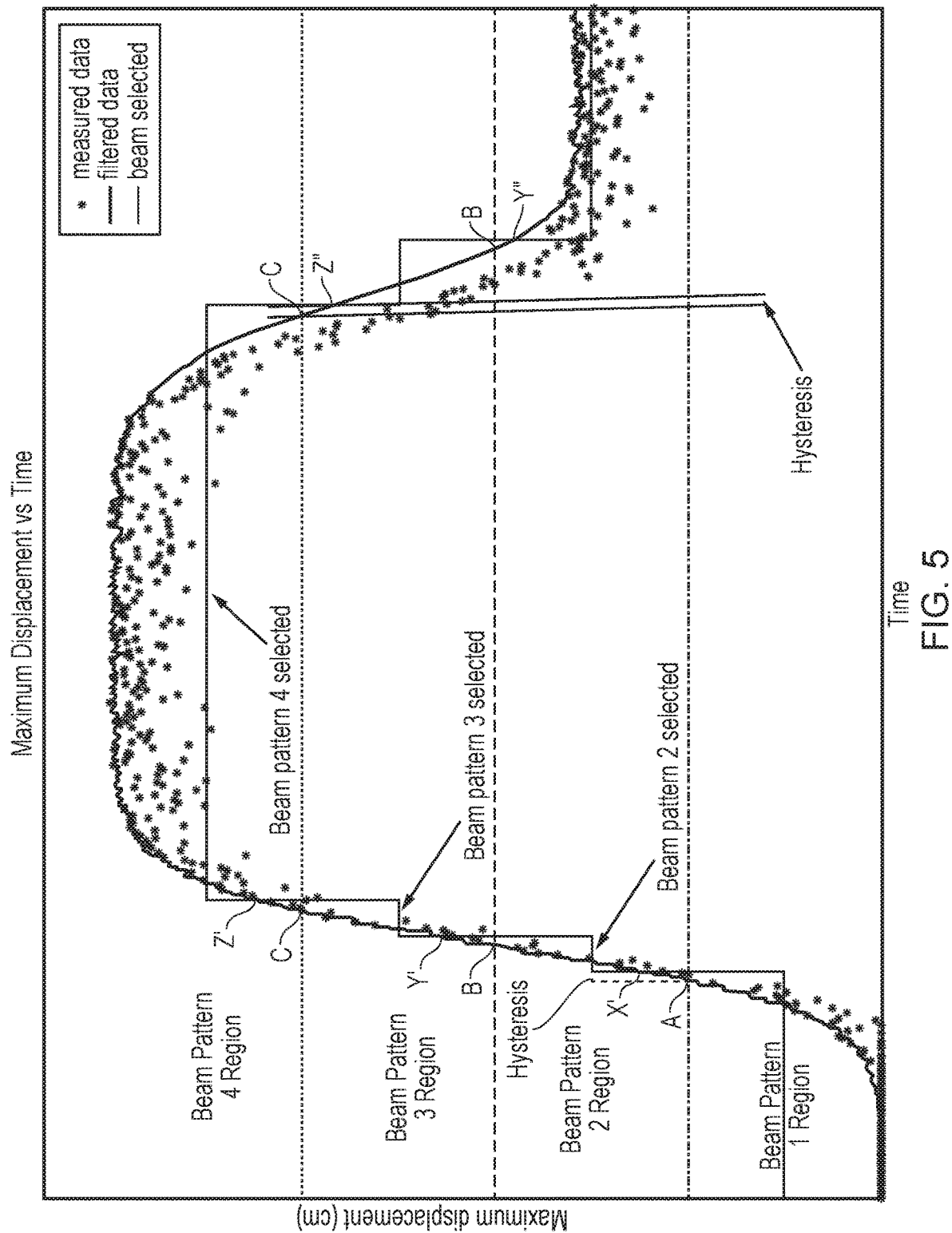
FIG. 5 is a graph schematically illustrating how a control signal may be generated based on movement data obtained from a sensor, and how beam patterns may be associated with various ranges of values of the control signal, in accordance with one example.

FIG. 5 is a graph illustrating an example sequence of sensor measurements taken over time. In this simulated example, it is assumed that the process starts with no motion being observed, but with the motion slowly building up to a maximum level, and then in due course dropping to a lower level. The individual stars in the figure indicate individual items of measurement data and the solid black line indicates the filtered data value obtained by application of a filtering operation to those individual items of measurement data. In this particular example, for simplicity, it is assumed that the control signal is produced directly from the filtered data value, but as discussed earlier, in the presence of multiple sensors the filtered data generation process can be repeated for each of the different sensors, with the filtered data values then being combined in order to produce the control signal value.

As shown in FIG. 5, certain threshold values of the control signal, namely the values A, B and C, are associated with thresholds between the different beam patterns that may be employed within the antenna apparatus. In this example, it is assumed that four beam patterns are supported, with beam pattern 1 being the narrowest beam and beam pattern 4 being the widest beam.

Figures 6, 7:
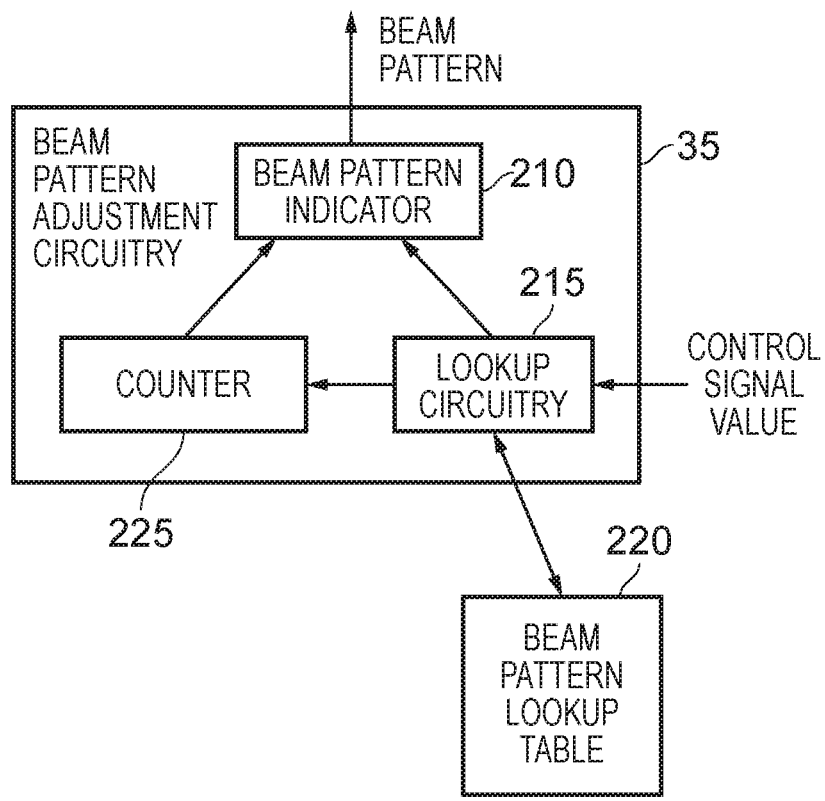
FIG. 6 illustrates a beam pattern lookup table in accordance with one example.
FIG. 7 is a block diagram illustrating in more detail components that may be provided within the beam pattern adjustment circuitry of FIG. 2 in accordance with one example implementation.

FIG. 6 illustrates an example lookup table that may be provided within the storage 40 for this particular example. Hence, it can be seen that a current value of the control signal can be used to perform a lookup within the table, in order to determine the beam pattern associated with that value.

Whilst the beam pattern adjustment circuitry 35 may be arranged to immediately change the beam pattern once the control signal value reaches a value indicating that the beam pattern should be changed, in one implementation the beam pattern adjustment circuitry is arranged to implement a time-based hysteresis process, in order to ensure that the control signal is reliably indicating a change in beam pattern before actually performing that change. This is indicated schematically in FIG. 5 by the labelled hysteresis periods. Hence, as shown on the rising edge of the graph in FIG. 5, once the control signal value exceeds the value A, this indicates a point where the lookup table would identify that the beam pattern should change to beam pattern 2 from beam pattern 1. However, rather than immediately making the change, the beam pattern adjustment circuitry continues to monitor subsequent values of the control signal, and only when those have reliably indicated that beam pattern 2 should be used for a certain period of time (the hysteresis time shown in FIG. 5) is the beam pattern actually switched to beam pattern 2. Similarly, as shown for the situation where the movement data indicates that the amount of movement is decreasing, when the control signal value drops below value C this indicates a point where the lookup operation will identify that the beam pattern should be switched from beam pattern 4 to beam pattern 3 to adopt a narrower beam and hence allow the average link quality value to be increased. However, again the switch is not made immediately at that point, but instead the value of the control signal continues to be monitored for a period of time, and only when the value of the control signal reliably indicates that transition in the beam pattern (during the hysteresis period shown on the right hand side of FIG. 5) is the beam pattern actually switched to beam pattern 3.

This process is discussed in more detail with reference to FIGS. 7 and 8. In particular, as shown in FIG. 7, the beam pattern adjustment circuitry 35 may include lookup circuitry 215 to perform a lookup operation within the beam pattern lookup table 220, based on a currently received control signal value. The lookup circuitry may be provided with discrete control signal values from the control signal generation circuitry 30, or alternatively the control signal value may be output continuously from the control signal generation circuitry, and the lookup circuitry 215 can be arranged to sample a current value of the control signal at discrete points in time, and to use each sampled value to perform the lookup operation.

As will be discussed in more detail later with reference to the flow diagram of FIG. 8, a counter 225 can also be maintained by the beam pattern adjustment circuitry, and the beam pattern indicator 210 can be arranged so that, only once the counter has reached a predetermined value, will any adjustment to the beam pattern be made based on the beam pattern indicated by the lookup operation performed by the lookup circuitry 215.

Figure 8:
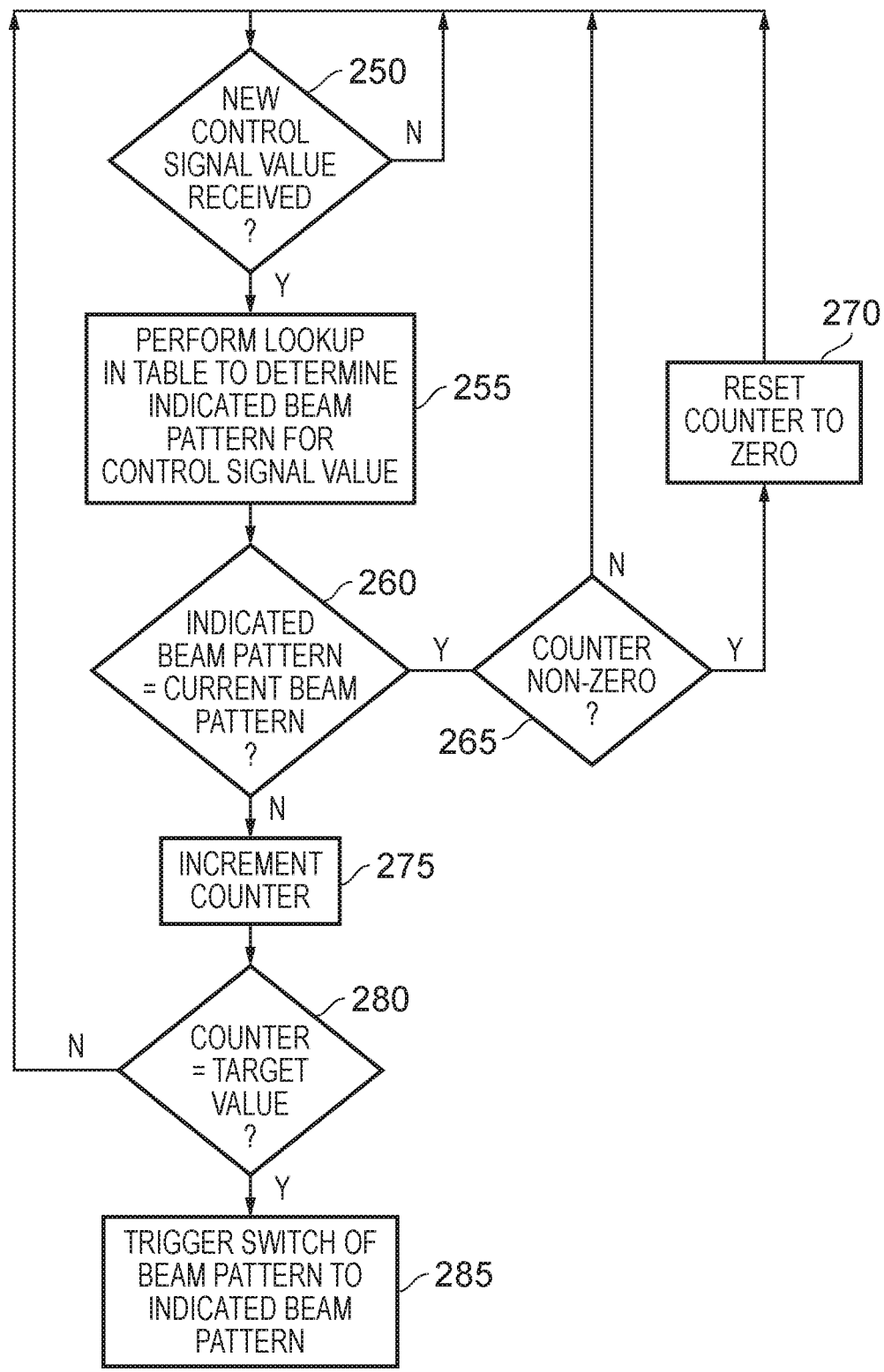
FIG. 8 is a flow diagram illustrating the operation of the beam pattern adjustment circuitry of FIG. 7 in accordance with one example.

Considering FIG. 8, at step 250 it is determined whether a new control signal value has been received by the lookup circuitry, and when it has a lookup operation is then performed at step 255 within the beam pattern lookup table to determine the indicated beam pattern for the control signal value.

It is then determined at step 260 whether the indicated beam pattern is the same as the current beam pattern. If it is, then it is determined at step 265 whether the counter 225 is currently non-zero. If not, then the process merely returns to step 250, but in one example implementation, if the counter is determined to be non-zero at step 265, it is reset to zero at step 270, prior to returning to step 250. In an alternative implementation, rather than resetting the counter at step 270, the counter could be decremented at step 270 by some determined amount.

If at step 260 it is determined that the indicated beam pattern is not the current beam pattern, then this indicates a situation where it may be appropriate to adjust the beam pattern. At step 275, the counter is incremented, and then at step 280 it is determined whether the counter has reached a target counter value. If not, the process returns to step 250. However, if the target counter value is determined to have been reached at step 280, then at step 285 a switch of the beam pattern to the indicated beam pattern is triggered. At this point, the beam pattern indicator 210 will use the beamforming coefficients obtained from the lookup table to produce a control signal for the beamforming circuitry 10 in order to cause the indicated beam pattern to be produced.

As an alternative to the time based hysteresis employed using the process of FIG. 8, or in addition thereto, the beam pattern lookup table can be altered as shown in FIG. 9, so that the value of the control signal that is associated with each beam pattern adjustment threshold differs depending on whether the motion is increasing or decreasing. The X, Y and Z values shown in the alternative table 300 are also illustrated in the graph of FIG. 5, other than the value X" which is not shown in FIG. 5 due to the fact that the example shown does not have a transition back from beam pattern 2 to beam pattern 1, and hence the threshold between beam pattern 2 and beam pattern 1 when motion is decreasing is not directly equated with a control signal value in the example of FIG. 5. As will be appreciated from a comparison of FIG. 9 and FIG. 5, due to the way in which the values of the control signal are specified for both increasing motion and decreasing motion, a hysteresis effect can be introduced based on the values that cause the switch to take place.

Figure 10:
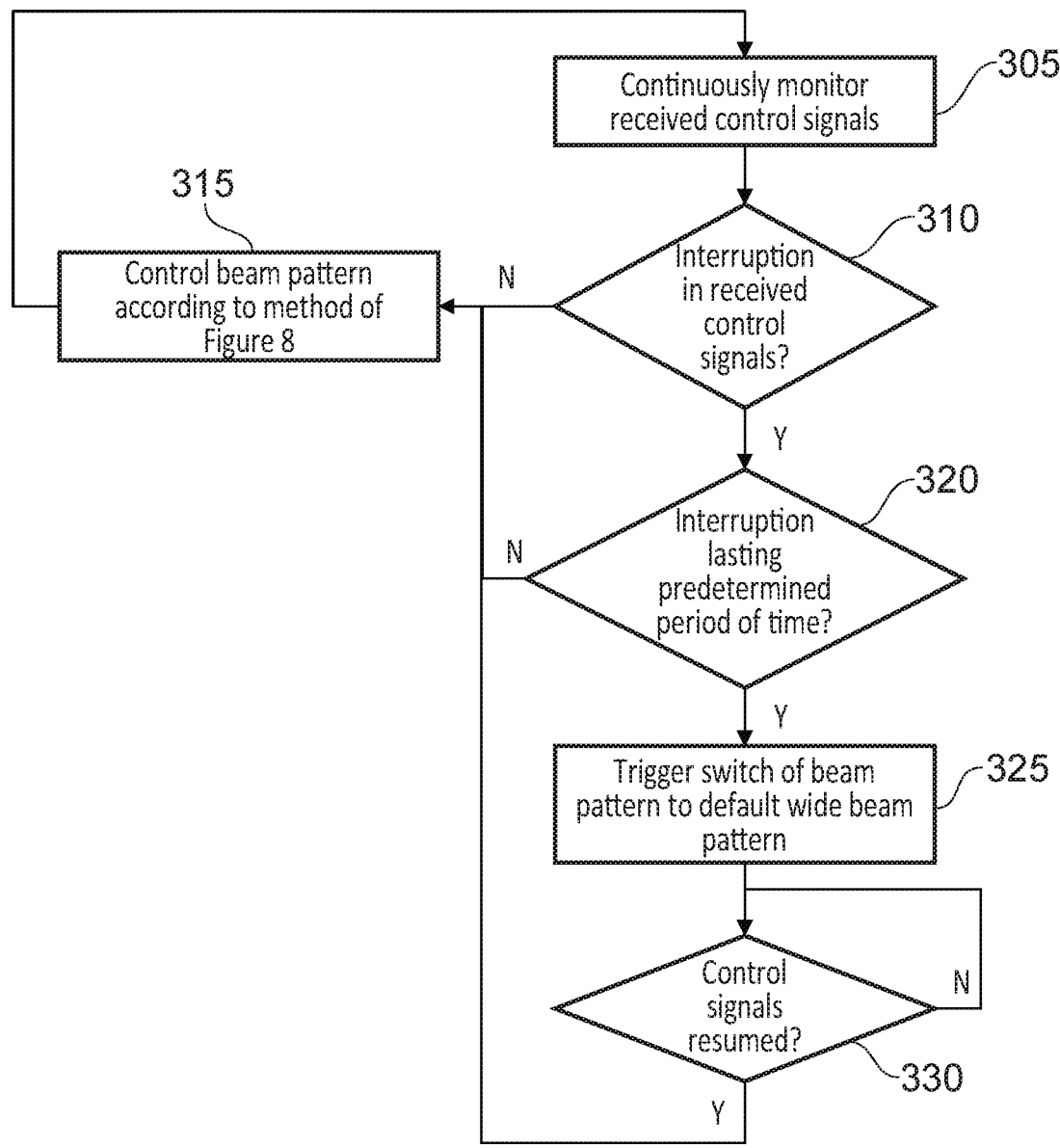
FIG. 10 is a flow diagram illustrating a method of adjusting the beam pattern in response to an interruption in reception of control signals.

FIG. 10 is a flow diagram showing a method of adjusting the beam pattern in response to an interruption in reception of control signals. As shown at step 305 of FIG. 10, the beam pattern adjustment circuitry 35 is configured to continuously monitor the control signals generated by the control signal generation circuitry 30, the control signals being indicative of a motion being imparted to the antenna apparatus as discussed above.

At step 310, the beam pattern adjustment circuitry 35 determines whether there is an interruption in the reception of the control signals from the control signal generation circuitry 30, which could be indicative of an interruption in the reception of motion indication data from the sensors 45, 50. If no interruption in reception of the control signals is detected, the method proceeds to a step 315 of controlling the beam pattern according to the method of FIG. 8. On the other hand, it an interruption is detected, the method proceeds to a step 320 of determining whether the interruption has lasted a predetermined period of time. If the interruption has not lasted the predetermined period of time, the method proceeds to step 315; otherwise the method continues to step 325. The predetermined period of time may be determined by the user, and may depend on the implementation. In some examples, the predetermined period of time may be zero, in which case this step 320 will be excluded from the method.

In step 325, the beam pattern adjustment circuitry 35 triggers a switch of beam pattern to a default wide beam pattern. For example, this may be a default beam pattern read from the storage 40 in the processor 25. The default beam pattern may be a beam pattern that covers a large angular range—for example, it may be the widest beam pattern stored in the storage 40 of the processor 25. Thus, when an interruption in the reception of control signals lasting a predetermined period of time is detected, the beam pattern adjustment circuitry 35 assumes that motion is being imparted on the antenna apparatus—a wide beam pattern is thus selected to mitigate against a variation in link quality that would be caused by the motion assumed to be imparted on the apparatus. In this way, regardless of whether or not the antenna apparatus is actually moving, the antenna apparatus can mitigate any possible variation in link quality due to motion of the antenna apparatus, even when the extent of the motion imparted to the apparatus is not known.

Returning to FIG. 10, the beam pattern adjustment circuitry 35 determines, in step 330, whether reception of the control signals has resumed. If reception of the control signals has not resumed, the beam pattern adjustment circuitry 35 waits until reception of the control signals has resumed. When reception of the control signals has resumed, the method passes to step 315, and the method of FIG. 8 is applied.

While, in the above example, the switch to the default wide beam pattern is triggered by an interruption in the reception of the control signals, it may instead be triggered by the reception of a control signal indicating that the reception of motion indication data from the sensors 45, 50 has been interrupted. The control signal generation circuitry 30 may generate such a control signal in response to detecting an interruption in the reception of motion indication data from the sensors 45, 50 lasting a predetermined period of time (which may be zero).

Using the method of FIG. 10, the variation in link quality caused by the motion of the antenna apparatus can be reduced even when the amount of motion imparted on the antenna apparatus is unknown.

From the above discussed examples, it will be appreciated that the techniques described herein provide a mechanism for adjusting the beam width employed by an antenna apparatus so as to take account of motion being imparted to the antenna apparatus, with the aim of seeking to reduce the effects that that motion could otherwise have on variation in link quality of the wireless communications that the antenna apparatus is taking part in with one or more other antenna apparatuses. Oscillating motions imparted to the antenna apparatus can be particularly problematic when the antenna apparatus is designed to use relatively narrow beams, as is often the case in modern wireless communication systems. Various types of oscillating motion, from generalised vibration through to sway or twisting motions, can contribute an adverse effect to variation in link quality. In some example deployments, it has been found that a twisting motion is particularly problematic as this can cause significant movement of a narrow beam within its azimuth plane, which can cause some significant variations in link quality to be observed. In some example deployments, the antenna apparatus may be installed on a moving vehicle such as a car, train or aeroplane. In these examples, the motion indication data received by the control signal generation circuitry may include measurements of the roll, pitch, yaw or groundspeed of the vehicle. In such examples, there may be a significant variation in link quality when the vehicle is changing direction (e.g. banking), causing significant movement of a narrow beam. However, through use of the techniques described herein, it is possible to dynamically switch the beam pattern so as to use beam patterns that are wider during periods of time where motion is likely to otherwise have an adverse effect on variation in link quality, but to then switch back to using narrower beams as the movement dies down, and hence the effects on link quality variation are reduced. The above techniques also include a mechanism for switching to a default wide beam pattern when there is an interruption in the reception of motion indication data describing the motion being imparted on the antenna apparatus, allowing the variation in link quality caused by any motion that may be being imparted on the apparatus during the interruption to be mitigated, despite the extent of this motion not being known.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

The invention claimed is:

1. An antenna apparatus comprising:
an antenna array;
beamforming circuitry to employ a beam pattern in order to generate a beam using the antenna array to facilitate wireless communication with at least one further antenna apparatus; and
beam pattern adjustment circuitry to receive control signals indicative of a motion being imparted to the antenna apparatus, and to adjust the beam pattern to be used by the beamforming circuitry in dependence on the received control signals, so as to alter a width of the beam in order to mitigate variation in link quality of the wireless communication due to the motion;
wherein in response to an indication of an interruption in reception of received motion indication data used to generate the control signals, the beam pattern adjustment circuitry is configured to adjust the beam pattern to be used by the beamforming circuitry to a default beam pattern.

2. The antenna apparatus as claimed in claim 1, wherein:
the indication comprises an interruption in reception of the control signals.

3. The antenna apparatus as claimed in claim 1, wherein:
the indication comprises a form of the received control signal indicating that the motion indication data has not been received.

4. The antenna apparatus as claimed in claim 1, wherein:
in response to an indication that reception of the received motion indication data has resumed, the beam pattern adjustment circuitry is configured to resume adjusting the beam pattern to be used by the beamforming circuitry in dependence on the received control signals.

5. The antenna apparatus as claimed in claim 1, wherein:
the default beam pattern produces a beam having a width greater than a predetermined width.

6. The antenna apparatus as claimed in claim 1, wherein:
the indication indicates that the interruption in reception of the received motion indication data has exceeded a predetermined time.

7. The antenna apparatus as claimed in claim 1, wherein:
when the employed beam pattern produces a beam having a first width, the beam pattern adjustment circuitry is arranged to be responsive to the received control signals indicating motion that is considered to cause a variation in link quality exceeding a chosen threshold, to adjust the employed beam pattern such that the beam produced has a second width greater than the first width.

8. The antenna apparatus as claimed in claim 7, wherein:
when the employed beam pattern produces a beam having the second width, the beam pattern adjustment circuitry is arranged to be responsive to the received control signals indicating motion that is considered to cause a variation in link quality below the chosen threshold, to adjust the employed beam pattern such that the beam produced has the first width.

9. The antenna apparatus as claimed in claim 7, wherein the beam pattern adjustment circuitry is arranged to be responsive to a plurality of thresholds associated with corresponding variations in link quality, and to adjust the employed beam pattern so as to adjust the beam width in dependence on each threshold being passed.

10. The antenna apparatus as claimed in claim 7, wherein the beam pattern adjustment circuitry is arranged to trigger adjustment of the employed beam pattern when a sequence of values of the received control signals indicate that the chosen threshold has been passed.

11. The antenna apparatus as claimed in claim 10, wherein the beam pattern adjustment circuitry is arranged to maintain a counter value to track occurrences of values of the received control signals that indicate that the chosen threshold has been passed, and to trigger adjustment of the employed beam pattern in dependence on the counter value.

12. The antenna apparatus as claimed in claim 7, wherein the value of the control signals that is associated with the chosen threshold differs depending on whether the motion is increasing or decreasing.

13. The antenna apparatus as claimed in claim 1, further comprising:
   storage to identify a plurality of beam patterns used to produce different width beams; and
   the beam pattern adjustment circuitry is arranged to select from the plurality of beam patterns a current beam pattern to be employed by the beamforming circuitry, dependent on the received control signals.

14. The antenna apparatus as claimed in claim 1, wherein the received control signals used by the beam pattern adjustment circuitry are indicative of the motion over a period of time.

15. The antenna apparatus as claimed in claim 1, further comprising:
   control signal generation circuitry arranged to generate the control signals dependent on the received motion indication data.

16. The antenna apparatus as claimed in claim 15, wherein the received control signals used by the beam pattern adjustment circuitry are indicative of the motion over a period of time, and the control signal generation circuitry is arranged to generate the control signals such that a current value of each control signal is dependent on motion indication data indicative of motion at a plurality of points in time.

17. The antenna apparatus as claimed in claim 15, further comprising:
   at least one motion sensor to detect the motion being imparted to the antenna apparatus, and the control signal generation circuitry is arranged to determine the control signals provided to the beam pattern adjustment circuitry based on movement data produced by the at least one motion sensor.

18. The antenna apparatus as claimed in claim 17, wherein the at least one motion sensor comprises at least a sensor to detect a twisting motion imparted to the antenna apparatus.

19. The antenna apparatus as claimed in claim 17, wherein the at least one motion sensor comprises one or more of a magnetometer and an accelerometer.

20. The antenna apparatus as claimed in claim 17, wherein the control signal generation circuitry comprises filtering circuitry to apply a filtering operation to determine the control signals based on the movement data received at multiple points in time.

21. The antenna apparatus as claimed in claim 20, wherein the filtering circuitry is arranged to produce the control signals from a filtered movement data value d(k), where k is a sampling time, by performing the following computation:

$$d(k) = \rho_{up} \cdot d(k-1) + (1-\rho_{up}) \cdot z(k), \text{ if } z(k) > d(k-1)$$

and $$d(k) = \rho_{down} \cdot d(k-1) + (1-\rho_{down}) \cdot z(k), \text{ otherwise,}$$

where $z(k)$ denotes an item of movement data at sampling time k, $\rho_{up}$ is a first chosen value between 0 and 1, and $\rho_{down}$ is a second chosen value between 0 and 1.

22. The antenna apparatus as claimed in claim 20, wherein the filtering circuitry is also arranged to receive an indication of observed variation in link quality, for use in determining the control signals.

23. The antenna apparatus as claimed in claim 22, wherein the observed variation in link quality is used by the filtering circuitry to influence a decision, based on the movement data, as to when to adjust the beam pattern so as to widen the beam produced.

24. The antenna apparatus as claimed in claim 1, further comprising:
   a lookup table structure referenced by the beam pattern adjustment circuitry to determine a form of beam pattern to be employed having regard to the received control signals.

25. The antenna apparatus as claimed in claim 1, wherein the control signals are indicative of an oscillating motion caused by an environmental influence.

26. The antenna apparatus as claimed in claim 25, wherein the oscillating motion results from vibration of a mounting structure to which the antenna apparatus is fixed.

27. A method of controlling a beam pattern employed by an antenna apparatus using an antenna array, comprising:
   using beamforming circuitry to employ the beam pattern in order to generate a beam using the antenna array to facilitate wireless communication with at least one further antenna apparatus;
   receiving control signals indicative of a motion being imparted to the antenna apparatus;
   adjusting the beam pattern to be used by the beamforming circuitry in dependence on the received control signals, so as to alter a width of the beam in order to mitigate variation in link quality of the wireless communication due to the motion; and
   in response to an indication of an interruption in reception of received motion indication data used to generate the control signals, adjusting the beam pattern to be used by the beamforming circuitry to a default beam pattern.

28. An antenna apparatus comprising:
   antenna array means;
   beamforming means for employing a beam pattern in order to generate a beam using the antenna array means to facilitate wireless communication with at least one further antenna apparatus; and
   beam pattern adjustment means for receiving control signals indicative of a motion being imparted to the antenna apparatus, and for adjusting the beam pattern to be used by the beamforming means in dependence on the received control signals, so as to alter a width of the beam in order to mitigate variation in link quality of the wireless communication due to the motion;
   wherein in response to an indication of an interruption in reception of received motion indication data used to generate the control signals, the beam pattern adjustment means is configured to adjust the beam pattern to be used by the beamforming means to a default beam pattern.

* * * * *